United States Patent [19]

Insetta et al.

[11] 4,021,708
[45] May 3, 1977

[54] VERTICLE ADJUSTABLE CAPACITOR ASSEMBLY

[75] Inventors: Victor Insetta, Northport; Harry V. Seaman, West Islip, both of N.Y.

[73] Assignee: American Technical Ceramics, Division of Phase Industries, Inc., Huntington Station, N.Y.

[22] Filed: Oct. 29, 1975

[21] Appl. No.: 626,747

[52] U.S. Cl. .............................. 361/295; 361/287
[51] Int. Cl.² ........................................ H01G 5/12
[58] Field of Search .................... 317/249 R, 249 T

[56] References Cited

UNITED STATES PATENTS

| | | | |
|---|---|---|---|
| 2,556,453 | 6/1951 | Sperry | 317/249 R |
| 2,748,328 | 5/1956 | Foint | 317/249 R |
| 2,827,601 | 3/1958 | Gamzon | 317/249 T |
| 3,252,012 | 5/1966 | Brown | 317/249 R |

Primary Examiner—E. A. Goldberg

Attorney, Agent, or Firm—Edward H. Loveman

[57] ABSTRACT

A vertical adjustable capacitor assembly includes a tubular dielectric body in which are embedded two diametrically opposed cylindrically curved electrically conductive plates. One plate serves as a stator plate and extends through one end of the tubular body to contact a terminal element at the bottom thereof. The other plate extends through both ends of the tubular body with one end of the plate contacting another terminal element at the bottom of the tubular body and the upper end of this plate is in direct electric circuit with the head of an electrically conductive rotary rotor having a shaft rotatably fitted in the axial, cylindrical bore of the tubular body. An arcuate member mounted on top of the tubular body prevents the rotor from axial movement while permitting rotation of the rotor. Rotation of the rotor through 180° in either direction from a center position of minimum capacitance, tunes the capacitor assembly through its entire range.

9 Claims, 14 Drawing Figures

VERTICLE ADJUSTABLE CAPACITOR ASSEMBLY

This invention relates to the art of miniature adjustable capacitors and more particularly concerns a miniature vertical adjustable capacitor assembly.

Miniature adjustable capacitors heretofore known have presented a number of difficulties and disadvantages. One type employs fixed and movable ceramic discs which are about one-fourth of an inch in diameter. This type is very delicate since the discs are brittle. The tuning mechanism does not operate smoothly so tuning is difficult. It is also subject to instability due to capacitance drift, externally applied mechanical shocks and vibration. Another type employs a tubular ceramic body which has a brass piston forming part of a lead screw. Mounting of this type of capacitor is difficult when it is mounted axially parallel to a substrate. None of the prior miniature adjustable capacitors were able to withstand shock and vibration up to 3,000 G's. Another object was that most prior miniature adjustable capacitors could not be adjusted to capacitance as low as 0.2 picafarads.

The present invention is directed at providing a miniature adjustable capacitor assembly which overcomes the above and other difficulties and disadvantages of prior adjustable capacitors, and at the same time it embodies many superior characteristics. Among these characteristics can be listed the following:

1. The miniature adjustable capacitor assembly is mountable axially vertical and it may be tuned in the vertical position.

2. It may be mounted on a substrate by standard chip attachment techniques, both leaded and non-leaded.

3. It may be adjusted to a capacitance as low as 0.2 picafarads and as high as 50 picafarads.

4. It presents a very low profile which permits more compact packaging, and avoids the antenna effect experienced with trimmer capacitors mounted vertically and having lead wires connected to an external circuit.

5. It has negligibly low inductance, which enables operation at very high frequencies without generating spurious oscillations.

6. It has a sealed construction with solder attachment pods separated from the rotor.

7. It is relatively inexpensive to manufacture since it has only three primary parts, namely: a ceramic tube, a rotor, and a rotor retainer.

8. It may be soldered directly to the top of an integrated circuit chip.

9. It may be made with high Q.

10. It is small enough to be used in digital watches to compensate for quartz crystal aging characteristics.

11. It is rugged enough to withstand shock, vibration and acceleration up to 3,000 G's.

12. It may be manufactured from materials other than ceramics i.e., plastic, glass, etc.

These and other objects and many of the attendant advantages of this invention will be readily appreciated as the same becomes better understood by reference to the following detailed description when considered in connection with the accompanying drawings in which.

Figure 1:
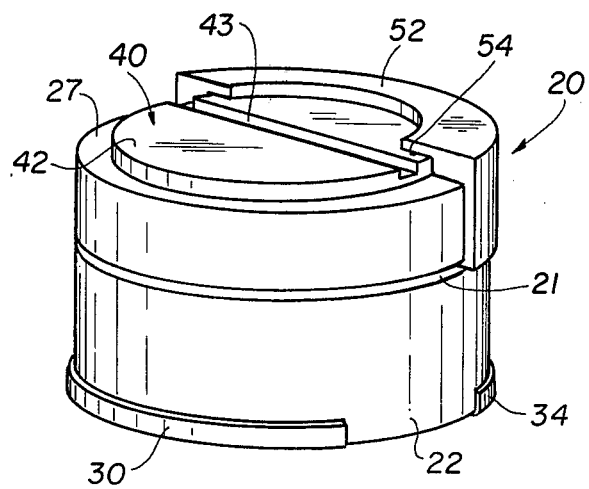
FIG. 1 is a perspective view on a very large scale of a miniature adjustable capacitor embodying the invention.
Figure 2:
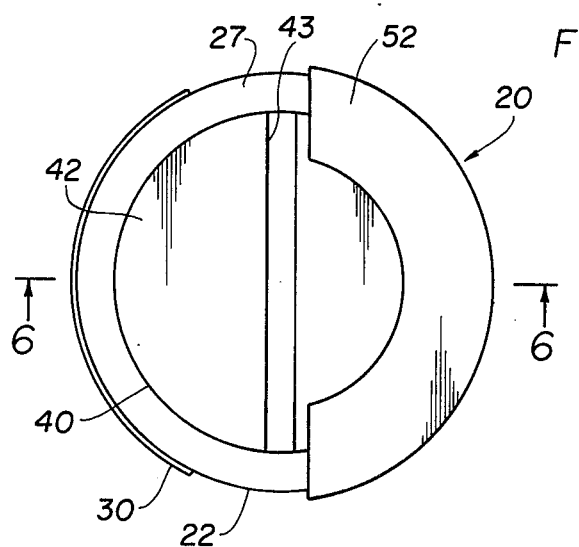
FIG. 2 is a top plan view of the adjustable capacitor.
Figure 3:
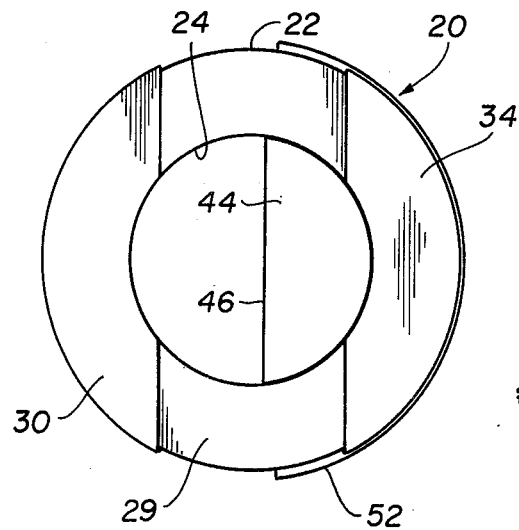
FIG. 3 is a bottom plan view of the adjustable capacitor.
Figure 5:
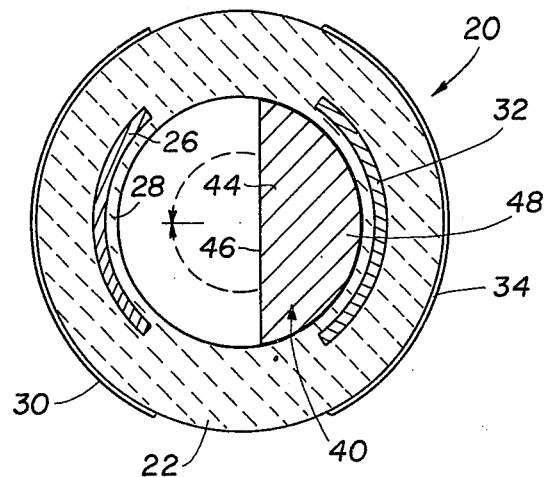
FIG. 5 is a cross sectional view taken along line 5—5 of FIG. 4.
Figure 14:
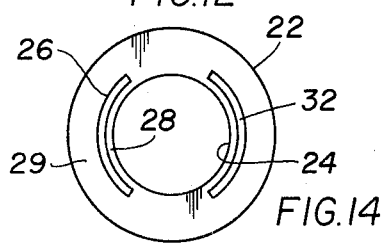
FIG. 14 is a bottom plan view of the ceramic tubular body per se.

Referring now to the drawings wherein like reference characters designate like or corresponding parts throughout, there is illustrated in FIGS. 1–14, a miniature adjustable or trimmer capacitor assembly generally illustrated by reference numeral 20 having a tubular body 22 formed with an axial bore 24 and made of ceramic or other dielectric material. Embedded in the tubular body 22 is a thin, cylindrically curved metallic plate 26 disposed radially close to the cylindrical bore 24 and separated therefrom by only a very thin wall 28, see FIGS. 5, 6 and 14. The plate 26 extends circumferentially somewhat less than 180°, and is spaced from an end top 27 of the ceramic body 22 to extend downwardly to a bottom end 29 of the ceramic body 22 where the plate 26 is exposed. An electrical contact is made with plate 26 by a thin conductive layer 30 of a metal such as silver, applied to the bottom end 29 of the tubular ceramic body 22. Another curved metal plate 32 is embedded in the tubular ceramic body 22 diametrically opposite the plate 26 and extends from the upper end 27 of the ceramic body 22 to the lower end 29 thereof. Applied to the bottom end 29 is another thin conductive layer 34 made of a metal such as silver, and forming a direct electrical contact with the plate 32. The metal layers 30 and 34 each extend circumferentially about 120° and are circumferentially spaced so that the two layers ae electrically insulated from each other. The two layers are in diametrically spaced positions as best shown in FIG. 3.

Rotatably carried by the tubular ceramic body 22 is a metallic tuning rotor 40, which has a disc-like head 42 provided with a diametral slot 43 into which the blade of a screwdriver may be inserted for turning the rotor 40. The rotor 40 has a shaft 44 which extends circumferentially only about 120° (see FIGS. 5 and 12) and is diametrically smaller than the head 42 with a flat inner side or wall 46 and a cylindrically curved outer side or wall 48. The rotor 40 is made of a metal such as brass. The shaft 44 forms a tight frictional fit inside the bore 24 and makes close sliding contact with the wall thereof. The shaft 44 terminates short of the bottom surface 29 of ceramic tubular body 22. An arcuate rotor retainer 52 may be made of a plastic material and is formed with a skirt 51 and a bottom rabbet 54 defining a recess which overlays a part of the head 42 of the rotor 40. The end of the skirt 51 of the retainer member 52 may contain a head 63 which fits into a groove 21 in the tubular ceramic body 22 so that the retainer 52 secures the rotor 40 to the top 27 of the tubular ceramic body 22. The retainer 52 is located diametrically opposite the capacitor plate 26 and over the plate 32.

Figure 7:
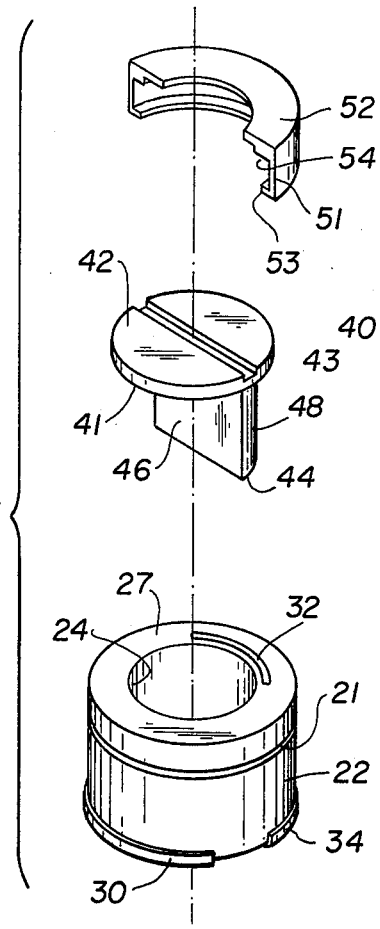
FIG. 7 is an exploded perspective view of parts of the adjustable capacitor on a smaller scale than that of FIGS. 1–6.
Figure 4:
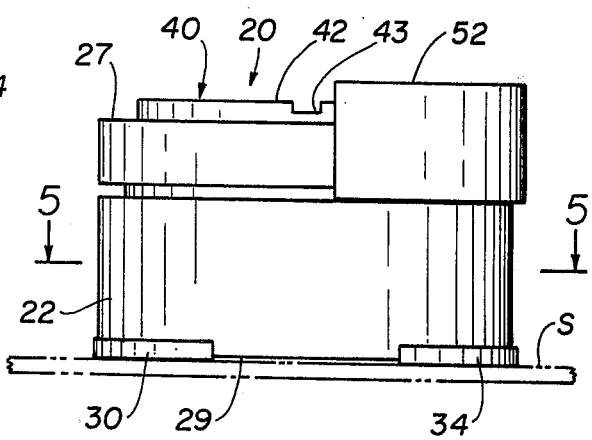
FIG. 4 is a side elevational view of the adjustable capacitor.
Figure 6:
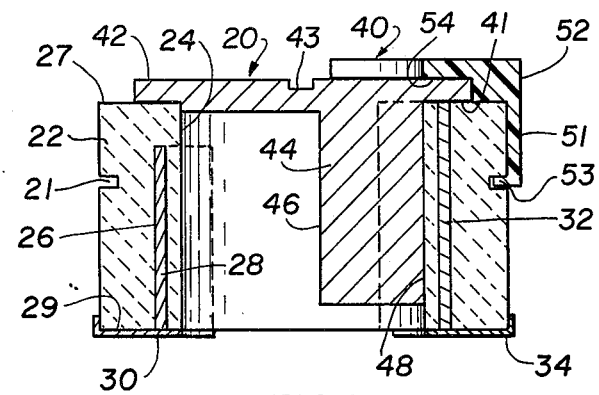
FIG. 6 is a vertical, axial sectional view taken along line 6—6 of FIG. 2.
Figure 8:
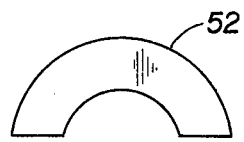
FIG. 8 is a top plan view of the rotor retainer per se.
Figure 9:
FIG. 9 is a bottom plan view of the rotor retainer.
Figure 10:
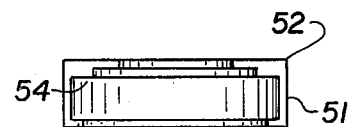
FIG. 10 is a side elevational view of the rotor retainer.
Figure 11:
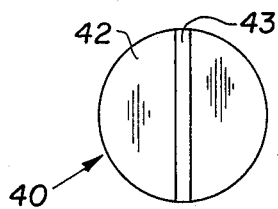
FIG. 11 is a top plan view of the tuning rotor per se.
Figure 12:
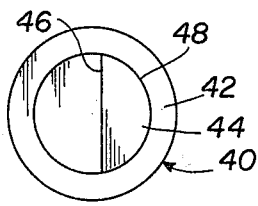
FIG. 12 is a bottom plan view of the tuning rotor.
Figure 13:
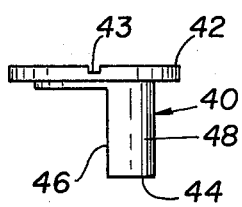
FIG. 13 is a side elevational view of the tuning rotor.

The head 42 of the rotor 40 is diametrally larger than the bore 24 so that an annular portion 41 overlays the top surface 27 of the ceramic body 22 and makes direct electrical contact with the upper end of the conductive plate 32 via an arcuate metal film layer 60 applied to the top surface 27; see FIGS. 6 and 7. By the arrangement described, the capacitor has basically the stator plate 26 opposed by the rotary conductive rotor 40. It will be noted that there are no wires inside or outside the assembly. The layers 30 and 34 serve as electrical terminals of the capacitor assembly 20. The capacitor assembly 20 may be secured directly to a substrate S (FIG. 4) by soldering or otherwise securing the terminals 30, 34 to two spaced external circuit points on the substrate S.

The assembly 20 may be made up in very small sizes. For example, the capacitor assembly can have an overall diameter of about 0.120 inches and may have an axial length of about 0.070 inches. It is characterised by rugged construction capable of withstanding extremely high shock, vibration, and acceleration. It is relatively inexpensive to manufacture. It is relatively simple in construction and easy to assemble. Should disassembly become necessary, it is only necessary to remove rotor retainer 52 and pull out rotor 40. It will not be necessary to remove the capacitor assembly 20 from its terminals 30 and 34 which are attached to the substrate. The capacitor mounts axially and is tuned axially. The rotor need be turned not more than 180° in either direction from the center position of FIGS. 1–6, to tune the capacitor through its entire tuning range. This range can be 0.2 to 2 or more picafarads, or 5 to 50 picafarads.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A vertical adjustable capacitor assembly comprising:
   a tubular dielectric body having a cylindrical axial bore, a flat top annular end and a flat bottom annular end;
   a cylindrically curved conductive plate embedded in said body and closely spaced from said bore, said plate terminating at said bottom end of said body for connection to an external circuit;
   a rotor having an electrical conductive shaft rotatably disposed in said bore, said shaft having an outer cylindrically curved wall frictionally contacting the inside of said bore and extending circumferentially less than 180° inside said bore so that said shaft may be rotated toward and away from said plate for changing the capacitance between said plate and said shaft said rotor having a head at said top end of said body, said head having a diameter larger than said bore to overlay and slidably contact said top end of said body when said rotor rotates; and
   a retainer member mounted on said top end of said body for contacting said rotor and retaining the same axially in said bore while permitting rotation of said rotor on said top annular end to change the capacitance of said capacitor assembly.

2. A vertical adjustable capacitor assembly as defined in claim 1 further comprising a conductive member embedded in said body and spaced from said plate, said conductive member extending to said body end of said body to define a direct electrical path with said rotor, said conductive member extending through said body to said bottom end thereof for connection to said external electrical circuit.

3. A vertical adjustable capacitor assembly as defined in claim 1, wherein said rotor has a tool engaging means to enable rotation of said rotor for changing said capacitance.

4. A vertical adjustable capacitor assembly as defined in claim 1 wherein said head of said rotor at said top end of said body is formed with a recess for engaging a tool to enable turning, said rotor to change the capacitance of said capacitor.

5. A vertical adjustable capacitor assembly as defined in claim 4 further comprising a conductive member embedded in said body and spaced from said plate, said conductive member extending to said top end of said body to define a direct electrical path with said head of said rotor and extending to said bottom end of said body for connection to said external circuit.

6. A vertical adjustable capacitor assembly as defined in claim 5, further comprising electrical conductive terminal elements attached to said bottom end of said body in circumferentially spaced positions and directly contacting respective ends of said plate and said conductive member thereat whereby said assembly may be mounted axially on a support carrying said external electrical circuit, with said terminal elements connected to spaced points of said external electrical circuit.

7. A vertical adjustable capacitor assembly as defined in claim 6, wherein said retainer member has an arcuate structure having a curved rabbet at one side overlaying said head of said rotor and a skirt having means for securing said retainer member to said top end of said body.

8. A vertical adjustable capacitor assembly as defined in claim 7, wherein said plate extends circumferentially less than 180° so that said shaft may be rotated fully away therefrom to minimize capacitance thereinbetween whereby the capacitance between said plate and said shaft may be changed through its entire range by rotating said rotor approximately 180° in either direction from a central position where said capacitance between said plate and said shaft is minimum.

9. A vertical adjustable capacitor assembly as defined in claim 8, wherein said conductive member is formed as another plate extending circumferentially less than 180° and exposed in a diametrically opposite position from said first name plate to minimize electrical capacitance between both plates.

* * * * *